Figure 1:
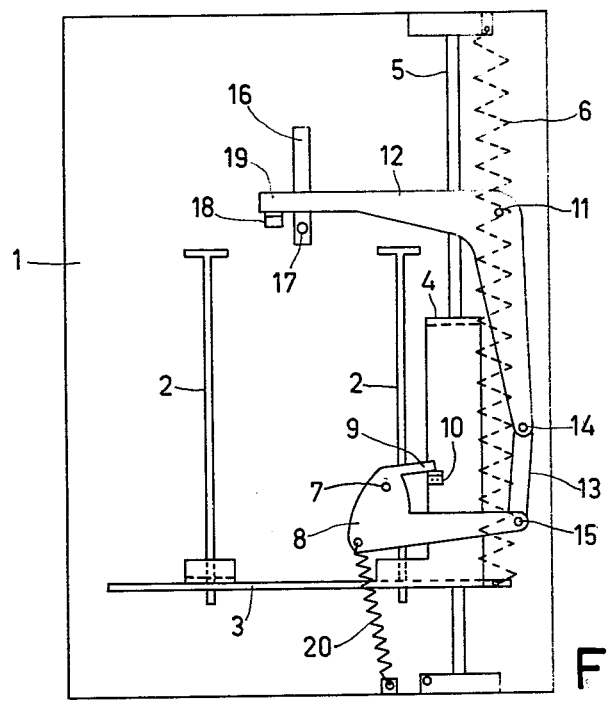

United States Patent [19]

Mugge

[11] 4,320,698
[45] Mar. 23, 1982

[54] TOASTER

[75] Inventor: Jan Mugge, Groningen, Netherlands

[73] Assignee: U.S. Philips Corporation, New York, N.Y.

[21] Appl. No.: 51,558

[22] Filed: Jun. 25, 1979

[30] Foreign Application Priority Data

Jul. 12, 1978 [NL] Netherlands .......................... 7807485

[51] Int. Cl.³ .............................................. A47J 37/08
[52] U.S. Cl. .......................................... 99/334; 99/338
[58] Field of Search ........................... 99/334, 330–331, 99/332–333, 335, 325–326, 327–328, 329 R, 338, 328, 334; 60/529; 73/329, 343, 363.1; 337/354

[56] References Cited

U.S. PATENT DOCUMENTS

| | | | |
|---|---|---|---|
| 1,560,578 | 11/1925 | Hummel et al. | 99/327 |
| 1,717,979 | 6/1929 | Hummel et al. | 99/327 |
| 2,052,927 | 9/1936 | Hallwood | 99/327 |
| 2,176,940 | 10/1939 | Young | 99/327 |
| 2,580,554 | 1/1952 | Kitto | 99/334 X |
| 3,681,568 | 8/1972 | Schaefer | 99/325 X |
| 3,720,155 | 3/1973 | Fritzsche | 99/325 X |
| 3,732,396 | 5/1973 | Tucker | 99/324 X |
| 3,739,149 | 6/1973 | Fischer et al. | 99/324 X |

Primary Examiner—Harvey C. Hornsby
Attorney, Agent, or Firm—Thomas A. Briody; William J. Streeter; Rolf E. Schneider

[57] ABSTRACT

A toaster having a mechanism for latching the slice support and a thermo-sensitive element for unlatching the slice support after a specific toasting time. A problem associated with such a toaster is that the toasting time is influenced by friction between the levers of the mechanism. A solution for this is to couple the levers to each other by means of an arm, so that a toggle mechanism is obtained.

3 Claims, 2 Drawing Figures

U.S. Patent  Mar. 23, 1982  4,320,698

TOASTER

This invention relates to a toaster having a frame, a slice support which is movable relative thereto, a spring being tensioned between the slice support and the frame, a mechanism which comprises a first lever which is pivotally journalled in the frame and latches the slice support in a locked position, which mechanism furthermore comprises a thermo-sensitive element and a second lever, which co-operates with the first lever and is journalled in the frame, on which second lever the thermo-sensitive element can exert a force so as to unlatch the slice support.

Such a toaster is known from U.S. Pat. No. 3,828,559. In a toaster of the aforementioned type co-operation between the levers is obtained in that the first lever has a hook-shaped end, which in the latched position of the slice support engages with an end of the second lever. During the unlatching of the slice support the thermo-sensitive element exerts a force on the second lever in order to overcome the frictional forces between the levers. As a result of this friction between the levers the levers will be pivoted abruptly. The disadvantage of this is that this affects the instant of unlatching of the slice support and thus the toasting time, so that the toasting time may vary. A further disadvantage of this construction is that the force exerted on the second lever by the thermo-sensitive element is comparatively great, which complicates the use of an arcuate thermo-sensitive element as described in above-mentioned patent.

It is an object of the present invention to provide a toaster having a minimal spread in toasting time, whilst the force required to unlatch the slice support is small. To this end the toaster in accordance with the invention is characterized in that the first lever and the second lever are coupled to each other by means of an arm having a toggling position, the arm near such toggling position locking the first lever in the latched position of the slice support, which arm is movable beyond the toggling position by means of the second lever under the influence of the thermo-sensitive element, so that the first lever is unlocked and the unlatched position of the slice support is obtained.

In the latched position of the slice support the arm is in a position just before its toggling position. The thermo-sensitive element exerts a force on the second lever, so that the arm is pushed through its toggling position. The force required for this decreases as the toggling position is approached and is zero in the toggling position. The advantage of this construction is that the instant of unlatching occurs directly after the toggling position is reached, so that the toasting time remains constant when toasting is repeated. A further advantage is that the force exerted by the thermo-sensitive element is only small, because the system of forces acts near the toggling position of the arm. Another advantage is that the levers are pivotally coupled to each other via the arm, so that only slight friction occurs. This construction makes the use of an arcuate thermo-sensitive element very attractive.

Preferably, the second lever engages with a stop in the locked position of the first lever.

A preferred embodiment of the toaster, in which a latching cam on the slice support engages with the hook-shaped end of the first lever in the latched position of the slice support, is characterized in that between the first lever and the frame there is arranged a spring, which in the unlatched position of the slice support maintains the first lever in a position in which the latching cam of the slice support can pass the hook-shaped end of the first lever.

Figure 2:
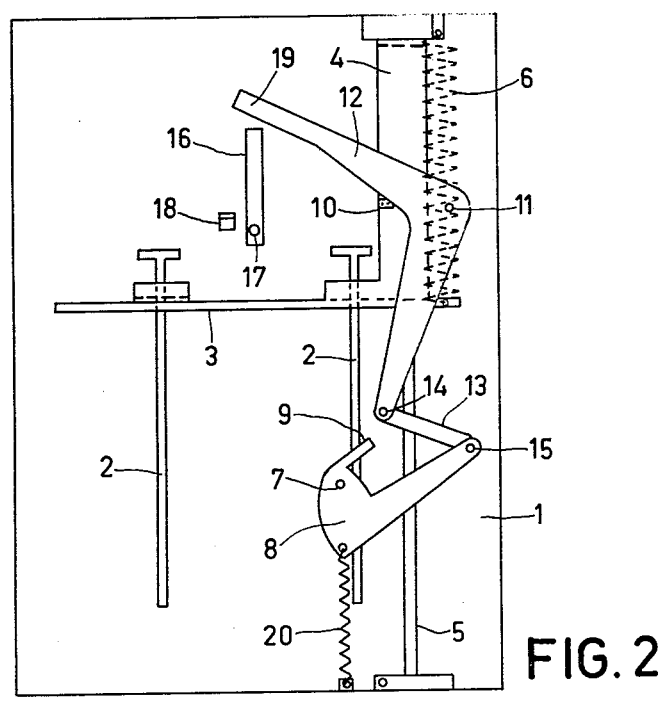

The invention will now be described in more detail with reference to the accompanying drawings, in which:

FIG. 1 shows the latching mechanism, the slice support being latched in its lowermost position, and FIG. 2 shows the mechanism of FIG. 1, the slice support being unlatched and being in its uppermost position.

Reference numeral 1 designates a side plate of the frame of a toaster. The slice support 3 can be moved up and down relative to the frame in vertical slots 2. For this purpose a bracket 4, which is rigidly connected to the slice support, is movable along a vertical guide rod 5. Between the frame and the slice support a spring 6 is tensioned. The mechanism for latching and unlatching the slice support includes a first lever 8, which is journalled so as to be pivotal about a pivot 7 of the frame. Said lever 8 has a hook-shaped end 9 for co-operation with a latching cam 10 of the bracket 4, which is connected to the slice support. The latching mechanism also includes a second lever 12, which is journalled so as to be pivotal about a pivot 11 of the frame. The levers 8 and 12 are pivotally coupled to each other by means of a toggle arm 13 via pivots 14 and 15, in such a way that a sort of overcentre mechanism is obtained.

The end of a thermo-sensitive element 17 extends through a slot 16 of the frame. In the present example the thermo-sensitive element is an arcuate element as described in the above-mentioned patent. Furthermore, there is provided a stop 18 for the end 19 of the lever 12.

The latching mechanism operates as follows:

In FIG. 1 the slice support 3 is shown in its latched lowermost position. In this position the bread is toasted. The cam 10 of the bracket 4, which is connected to the slice support, then engages with the end 9 of the first lever 8. The first lever is kept in its locked position by means of the spring 6 and the stop 18, which prevent the lever 12 from being rotated further counter-clockwise. In this position the arm 13 is in a position just before its toggling position and the first lever 8 is locked. The toggling position is reached when the pivots 11, 14 and 15 are in line.

The slice support is unlatched when the thermo-sensitive element 17 moves upwards in the slot 16. As a result of this the end 19 of the lever 12 is lifted, so that the arm 13 is urged through the toggling position and the first lever 8 is unlocked. The force required for this is only a few grammes and decreases to zero according as the toggling position is approached. In the toggling position the moment, which is exerted on the arm 13 and is caused by the force of the spring 6, is reversed so that the first lever 8 pivots very rapidly counter-clockwise. The end 9 then pivots away from cam 10 and thus unlatches the slice support 3, which moves upwards under the influence of the spring 6. The position then occupied by the slice support and the latching mechanism is shown in FIG. 2.

With this construction the instant at which the slice support is unlatched occurs immediately after the toggling position is reached. The spread in toasting time now depends only to a very small extent on the mechanical influences of the mechanism. In the locked position of latching the first lever the amount by which the arm 13 is pivoted out of its toggling position also has no effect on the spread. The friction in the pivots 7, 11, 14 and 15 only has a very small effect on the force to be exerted by the thermo-sensitive element 17.

As the displacement of the arm 13 up to its toggling position is accompanied by a very small pivotal movement of the first lever 8, the displacement of the end 9 relative to the cam 10 will be small. By moreover providing the end 9 and the cam 10 with smooth surfaces, the frictional force between the hook and the cam will be small.

In order to re-actuate the toaster the slice support 3 is moved to its lowermost position by hand. The cam 10 should then be allowed to pass the end 9, before the latching mechanism has reached the position shown in FIG. 1. This is achieved by means of a spring 20, which is tensioned between the first lever 8 and the frame 11. This spring 20 keeps the latching mechanism in the position shown in FIG. 2. The slice support 3 is now latched as follows: as the slice support is pushed downwards the first lever 8 is urged downward with the aid of the cam 10 until the toggling position is reached (pivots 11, 14, 15 in line). When the slice support is released in this position, the second lever 12 will pivot counter-clockwise, because the centre of gravity of this lever is situated to the left of the pivot 11. However, this could also be achieved under the influence of a spring. The end 19 of the second lever engages with the stop 18 and the cam 10 engages with the end 9 of the first lever 8, so that the latching mechanism again occupies the position shown in FIG. 1.

What is claimed is:

1. A toaster comprising a frame; a slice support movable relative to the frame between an unlatched position and a latched position; a first spring tensioned between the slice support and the frame; a first lever pivotally journalled in the frame; a cam on the slice support for engagement with one end of the first lever in the latched position of the slice support for locking the slice support in its latched position, said first lever one end being hook-shaped; a second lever pivotally journalled in the frame; a thermo-sensitive element arranged to exert a force on the second lever to cause pivotal movement thereof; and a toggle arm pivotally coupled at one end to the other end of the first lever and pivotally coupled at its other end to one end of the second lever, said arm being near its toggling position when the first lever locks the slice support in its latched position, and said arm being movable beyond its toggling position by means of the second lever when the thermo-sensitive element exerts said force thereon, whereby the first lever is unlocked and the slice support is returned to its unlatched position by said first spring.

2. A toaster according to claim 1, which includes a stop engaged by the other end of the second lever in the locked position of the first lever.

3. A toaster according to claim 1 or 2, which includes a second spring tensioned between said first lever and the frame, said second spring, in the unlatched position of the slice support, maintaining the first lever in a position whereby the cam on the slice support can pass the hook-shaped end of the first lever upon movement of the slice support to its latched position.

* * * * *